(12) United States Patent
Tamaizumi et al.

(10) Patent No.: US 8,897,965 B2
(45) Date of Patent: Nov. 25, 2014

(54) ELECTRIC POWER STEERING APPARATUS

(75) Inventors: Terutaka Tamaizumi, Okazaki (JP); Hirozumi Eki, Okazaki (JP); Masayuki Kita, Okazaki (JP); Isao Namikawa, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/982,119

(22) PCT Filed: Mar. 28, 2012

(86) PCT No.: PCT/JP2012/058257
§ 371 (c)(1),
(2), (4) Date: Jul. 26, 2013

(87) PCT Pub. No.: WO2012/133590
PCT Pub. Date: Oct. 4, 2012

(65) Prior Publication Data
US 2013/0311044 A1 Nov. 21, 2013

(30) Foreign Application Priority Data

Mar. 29, 2011 (JP) .................................. 2011-072994
Mar. 29, 2011 (JP) .................................. 2011-072995

(51) Int. Cl.
*B62D 6/08* (2006.01)
*B62D 5/04* (2006.01)

(52) U.S. Cl.
CPC .............. *B62D 5/0472* (2013.01); *B62D 6/08* (2013.01); *B62D 5/0463* (2013.01)
USPC .................. 701/42; 701/36; 701/41; 180/204

(58) Field of Classification Search
None
See application file for complete search history.

(56) References Cited

U.S. PATENT DOCUMENTS

2002/0005314 A1* 1/2002 Takehara et al. ............. 180/443
2002/0125063 A1* 9/2002 Kurishige et al. ............ 180/443

(Continued)

FOREIGN PATENT DOCUMENTS

JP  A-2005-112007  4/2005
JP  A-2006-131191  5/2006

(Continued)

OTHER PUBLICATIONS

International Preliminary Report on Patentability issued in International Application No. PCT/JP2012/058257 dated Oct. 2, 2013.

(Continued)

*Primary Examiner* — Jonathan M Dager
(74) *Attorney, Agent, or Firm* — Oliff PLC

(57) ABSTRACT

An assisting command value calculating unit calculates a first assisting factor on the basis of the value of a torque differential control volume added to a basic assist control volume based on a steering torque value, while increasing or decreasing, on the basis of an assisting gradient, the torque differential control volume based on a torque differential value. The pinion angle F/B control unit calculates a pinion angle command value, capable of being converted to a steering angle of the steering wheel, on the basis of the steering torque and the first assisting factor, and executes rotational angle feedback control. The assisting command value calculating unit calculates an assisting command value on the basis of the value of a second assisting factor, calculated by the pinion angle F/B control unit, added to the first assisting factor.

15 Claims, 11 Drawing Sheets

(56) References Cited

U.S. PATENT DOCUMENTS

| | | | |
|---|---|---|---|
| 2003/0074120 A1* | 4/2003 | Kleinau | 701/41 |
| 2005/0125131 A1 | 6/2005 | Kato et al. | |
| 2005/0228564 A1* | 10/2005 | Kato et al. | 701/41 |
| 2005/0273235 A1* | 12/2005 | Ohta et al. | 701/41 |
| 2006/0086560 A1 | 4/2006 | Furusho et al. | |
| 2007/0006674 A1* | 1/2007 | Kuroumaru et al. | 74/388 PS |
| 2007/0107977 A1* | 5/2007 | Shibata | 180/444 |
| 2007/0107979 A1* | 5/2007 | Limpibunterng et al. | 180/446 |
| 2007/0168094 A1* | 7/2007 | Nishiyama | 701/41 |
| 2007/0192005 A1* | 8/2007 | Ishikawa et al. | 701/41 |
| 2007/0205041 A1* | 9/2007 | Nishizaki et al. | 180/446 |
| 2008/0033613 A1 | 2/2008 | Tamaizumi et al. | |
| 2008/0262678 A1* | 10/2008 | Nishimura et al. | 701/42 |
| 2008/0277192 A1* | 11/2008 | Nishimura | 180/444 |
| 2008/0296085 A1* | 12/2008 | Suzuki | 180/444 |
| 2009/0024280 A1* | 1/2009 | Kato et al. | 701/41 |
| 2009/0026003 A1* | 1/2009 | Kato et al. | 180/446 |
| 2009/0030573 A1* | 1/2009 | Mikamo et al. | 701/41 |
| 2009/0039727 A1* | 2/2009 | Kato | 310/216 |
| 2009/0112405 A1 | 4/2009 | Tamaizumi et al. | |
| 2011/0010050 A1* | 1/2011 | Suzuki et al. | 701/41 |
| 2012/0197493 A1* | 8/2012 | Fujimoto et al. | 701/41 |
| 2013/0161114 A1* | 6/2013 | Bando et al. | 180/443 |
| 2014/0058628 A1* | 2/2014 | Tamaizumi | 701/42 |
| 2014/0058629 A1* | 2/2014 | Tamaizumi et al. | 701/42 |
| 2014/0180544 A1* | 6/2014 | Itamoto et al. | 701/41 |
| 2014/0207337 A1* | 7/2014 | Tamaizumi | 701/42 |

FOREIGN PATENT DOCUMENTS

| | | |
|---|---|---|
| JP | A-2006-151360 | 6/2006 |
| JP | A-2009-90953 | 4/2009 |
| JP | A-2009-107492 | 5/2009 |
| JP | A-2010-36806 | 2/2010 |
| JP | B2-4453012 | 4/2010 |

OTHER PUBLICATIONS

International Search Report issued in International Application No. PCT/JP2012/058257 on May 22, 2012 (with translation).

* cited by examiner

ELECTRIC POWER STEERING APPARATUS

FIELD OF THE INVENTION

The present invention relates to an electric power steering apparatus.

BACKGROUND OF THE INVENTION

Conventionally, electric power steering apparatus (EPS) having a motor as a drive source are known. For EPS, various technologies are proposed which utilize a high controllability to realize an excellent steering feeling.

For example, an EPS disclosed in Patent Document 1 optimizes the characteristic of compensation control of each kind based on an assist gradient that is a ratio of a change in an assist force relative to a change in steering torque. That is, the EPS calculates a torque derivative control level that is a compensation component based on the derivative of steering torque. Next, the EPS adds the compensation component to the basic component of an assist instruction value corresponding to a target assist force. Hence, the responsiveness of applying an assist force relative to a change in the steering torque can be enhanced. Accordingly, a response delay of applying an assist force can be suppressed, and thus, for example, a dragging feeling occurring at the beginning of the turning of a steering wheel and a rolling feeling occurring at the end of the turning of the steering wheel can be avoided. Moreover, it becomes possible to efficiently suppress reverse input vibration from turning wheels.

Conversely, within a range where an assist gradient is large, an assist force largely changes relative to a slight change in steering torque. Within such a range, a torque derivative control level, which has a phase advancing characteristic, becomes excessive. Accordingly, the response feeling when turning the steering wheel decreases, and thus the steering feeling is likely to decrease.

According to the above-explained conventional technology, however, by reducing the torque derivative control level in accordance with an increase of the assist gradient, the torque derivative control level can be optimized across a broad control range. Hence, it becomes possible to realize a good steering feeling which has an excellent steering characteristic and has little adverse effect of reverse input vibration.

Moreover, an EPS disclosed in Patent Document 2 includes a first normative model that defines a target steering torque based on a steering angle, and a second normative model that defines a target steering angle (target rolling angle) of a steering system based on steering torque. The actuation of the motor is controlled based on both of those normative models (ideal models). That is, a steering torque is always set to be an optimized value by a first assist component obtained by executing a torque feedback control in order to cause an actual steering torque to follow a target steering torque. Moreover, reverse input vibration from turning wheels can be canceled by a second assist component obtained by performing a steering angle feedback control that causes an actual steering angle to follow a target steering angle. That is, when the actuation of the motor is controlled based on an addition value of the first and second assist components, a steering feeling, which has an excellent steering characteristic and has little adverse effect of reverse input vibration, can be realized.

In recent years, a further high level quietness is required for vehicles. According to the conventional technology disclosed in patent Document 1, however, it is difficult to accomplish both suppression of reverse input vibration and excellent steering characteristic. More specifically, a reduction of small reverse input vibration, i.e., vibration components with a relatively high frequency caused at the time of, for example, straight running and braking is required. In order to satisfy this requisition, when a torque derivative control level is increased, the steering characteristic becomes poor.

Conversely, when the conventional technology disclosed in Patent Document 2 is applied, theoretically, all reverse input vibrations can be suppressed. When, however, the possibility that the two models interfere with each other is taken into consideration, it is difficult to cause an actual steering condition to match both of the normative models. Hence, it is difficult to accomplish both suppression of reverse input vibration and excellent steering characteristic at a high level.

PRIOR ART DOCUMENTS

Patent Documents

Patent Document 1: Japanese Laid-Open Patent Publication No. 2006-131191
Patent Document 2: Japanese Patent No. 4453012

DISCLOSURE OF THE INVENTION

It is an object of the present invention to provide an electric power steering apparatus that is capable of realizing an excellent steering characteristic while suppressing reverse input vibration at a further high level.

In order to address the above disadvantages, a first aspect of the present invention provides an electric power steering apparatus that includes a steering force assisting device and a control unit. The steering force assisting device includes a motor as a drive source and applies assist force to a steering system. The control unit sets a basic component of the assist force based on steering torque transmitted to a steering shaft. The control unit increases/decreases a compensation component based on a change rate of the basic component relative to a change in the steering torque, and calculates a first assist component based on a value obtained by adding the compensation component to the basic component. The control unit calculates a rotation angle instruction value of a rotation shaft that can be converted into a turning angle of a turning wheel based on the steering torque and the first assist component. The control unit executes a rotation angle feedback control based on the rotation angle instruction value to calculate a second assist component. The control unit controls an actuation of the steering force assisting device based on an assist instruction value that is on a basis of a value obtained by adding the second assist component to the first assist component.

According to this structure, the rotation angle instruction value of the rotation shaft that can be converted into a turning angle of turning wheels is calculated based on the steering torque and the first assist component. Next, the second assist component is calculated upon execution of a rotation angle feedback control based on the rotation angle instruction value, and thus reverse input vibration from the turning wheels can be effectively canceled. Accordingly, it becomes possible to design an optimization control on the compensation control characteristic of each kind based on an assist gradient while mainly focusing on the steering characteristic without taking the decreasing function of reverse input vibration into consideration.

In the above-explained electric power steering apparatus, it is preferable that the control unit should calculate input torque transmitted to the rotation shaft based on an addition value of the steering torque with the first assist component, and the control unit should calculate the rotation angle instruction value based on an ideal model of the rotation angle relative to input torque.

According to this structure, the ideal model utilized for a calculation of the assist instruction value is only one model utilized when the second assist component is calculated. Hence, the second assist component does not interfere with the first assist component. Accordingly, it becomes possible to suppress reverse input vibration at a further high level and to realize an excellent steering characteristic.

In the above-explained electric power steering apparatus, it is preferable that the ideal model should be represented by a spring term based on a rotation angle, a viscosity term based on a rotation angular speed, and an inertia term on a basis of a value obtained by subtracting a spring component and a viscosity component that are respective control outputs by the spring term and the viscosity term from the input torque, and the control unit should include a setting unit that is capable of changing a characteristic of the spring term.

The ideal model of the rotation angle relative to the input torque can be divided into an EPS-side ideal model depending on the characteristic of each component of the electric power steering apparatus (EPS) and a vehicle-side ideal model depending on the characteristic of a vehicle built with the EPS. In this case, the EPS-side ideal model is established by an inertia term and a viscosity term, while the vehicle-side ideal model is established by a spring term.

According to this structure, the characteristic of the spring term of the ideal model of the rotation angle relative to the input torque becomes changeable, and thus the characteristic of the vehicle affecting the steering characteristic can be set arbitrary. That is, regardless of an actual characteristic, the characteristic of the vehicle can be formed arbitrary by a control, and thus the degree of freedom for designing increases. Accordingly, a common setting to the steering characteristic can be made regardless of a vehicle on which the electric power steering apparatus is mounted, thereby improving the general versatility.

In the above-explained electric power steering apparatus, it is preferable that the control unit should execute a current feedback control based on a current instruction value corresponding to the assist instruction value, supplies drive power to the motor, and controls an actuation of the steering force assisting device, and the control unit should correct a value of the first assist component utilized for a calculation of the rotation angle instruction value based on a current deviation between the current instruction value and an actual current value.

In general, in the case of an EPS utilizing an in-vehicle power source like a battery, the voltage that the control unit can output is limited. Hence, the assist torque becomes likely to be insufficient at the time of fast-speed steering operation, etc., and a deviation in a rotation angle feedback control increases, and thus the assist insufficiency increases. In this point, according to the present invention, the value of the first assist component utilized for a calculation of the rotation angle instruction value is reduced in accordance with the current deviation. Accordingly, the increase of the deviation at the time of the rotation angle feedback control can be suppressed.

In the above-explained electric power steering apparatus, it is preferable that the control unit should execute a phase compensation on detected steering torque, the control unit should calculate the basic component based on steering torque having undergone the phase compensation, and the control unit should change a characteristic of the phase compensation based on a change rate of the basic component relative to a change in the steering torque.

According to this structure, the characteristic of the phase compensation is changed in accordance with the increase of the assist gradient that is a change ratio of the basic component relative to a change in the steering torque, and the current feedback control is designed. Hence, an occurrence of vibration is suppressed, the control becomes stabilized, and the responsiveness of the current control enhances, thereby obtaining a good steering feeling.

In the above-explained electric power steering apparatus, it is preferable that the control unit should calculate a friction component based on a rotation angular speed of the rotation shaft, and the control unit should calculate the input torque based on a value obtained by subtracting the friction component from an addition value of the steering torque and the first assist component.

According to this structure, the input torque can be precisely calculated.

In the above-explained electric power steering apparatus, it is preferable that the control unit should execute a Current feedback control based on a current instruction value corresponding to the assist instruction value, and the control unit should supply drive power to the motor to control an actuation of the steering force assisting device, and corrects a value of the second assist component based on a deviation between the current instruction value and an actual current value.

In the above-explained electric power steering apparatus, it is preferable that when an actual rotation angle utilized for an execution of the rotation angle feedback control is undetectable, the control unit should terminate a calculation of the second assist component.

It is preferable that the above-explained electric power steering apparatus should further include a road information compensating unit that calculates a road information compensation component which reduces the second assist component, and a magnitude of the second assist component should be adjustable in accordance with a magnitude of the road information compensation component.

A driver obtains large pieces of information relating to the running vehicle, such as a road condition and the gripping force of the turning wheels, from reverse input torque transmitted to the steering wheel through a steering system. That is, the reverse input from the turning wheels is road information, and if such information is completely canceled, it may result in the reduction of the steering feeling. In this point, according to the present invention, by setting the road information compensation component, the magnitude of the second assist component can be freely controlled. Next, reverse input torque developed due to a difference between the second control component and the road information compensation component can be transmitted to the steering wheel as road information. Accordingly, vibration input as noises from the turning wheels can be suppressed, while at the same time, necessary road information can be obtained. As a result, reverse input vibration can be suppressed, and an excellent steering characteristic can be realized.

In the above-explained electric power steering apparatus, it is preferable that the faster a vehicle speed is, the smaller the road information compensation component calculated by the road information compensating unit should become.

Reverse input vibration produced at the time of straight running and braking, etc., increases together with a vehicle speed. In this point, according to the present invention, the faster the vehicle speed is, the smaller the road information compensation component becomes, thereby effectively activating the vibration suppression effect upon execution of the rotation angle feedback control. As a result, reverse input vibration that becomes noises can be effectively suppressed, and further larger pieces of road information are transmitted to the steering wheel.

In the above-explained electric power steering apparatus, it is preferable that when an actual rotation angle utilized for the rotation angle feedback control is undetectable, the road information compensating unit should cancel the second assist component by the road information compensation component.

In the above-explained electric power steering apparatus, it is preferable that the control unit should calculate the rotation angle instruction value based on an ideal model of the rotation angle relative to input torque transmitted to the rotation shaft, and execute the rotation angle feedback control, the road information compensating unit should estimate a divergence from the ideal model based on at least either one of a rotation angle deviation of the rotation shaft and a rotation angular speed deviation, and the road information compensating unit should change a magnitude of the road information compensation component in accordance with the divergence.

In general, the more the rotation angle deviation and the rotation angular speed deviation increase, the higher the estimated divergence from the ideal model becomes. In this case, the higher the divergence is, the more the road information compensation component is increased. Moreover, the "rotation angle feedback control based on the ideal model" is invalidated, thereby stabilizing the control.

In the above-explained electric power steering apparatus, it is preferable that when estimating that an actual condition differs from the ideal model based on at least either one of the rotation angle deviation of the rotation shaft and the rotation angular speed deviation, the road information compensating unit should cancel the second assist component by the road information compensation component.

When a normal actual rotation angle is undetectable, it becomes unable to execute the rotation angle feedback control correctly. Moreover, at the time of execution of the rotation angle feedback control, when the rotation angle deviation (and the rotation angular speed deviation) remarkably increases, it is estimated that it becomes unable to cause the actual rotation angle to follow the rotation angle instruction value calculated based on the ideal model, i.e., that the actual condition differs from the ideal model. When, under such a condition, the rotation angle feedback control is continued, the assist insufficiency increases, and thus the control becomes likely to be unstable. In this point, according to the present invention, when "the rotation angle feedback control based on the ideal model should be terminated", the rotation angle feedback control based on the ideal model is completely invalidated. Hence, a fail-safe is quickly accomplished, and thus a further high reliability is ensured.

In the above-explained electric power steering apparatus, it is preferable that the road information compensating unit decreases the road information compensation component at a time of braking.

At the time of braking, vibration with relatively high frequencies that are often recognized as noises is produced. In this point, according to the present invention, the road information compensation component at the time of braking is reduced, thereby effectively accomplishing the vibration suppression effect upon execution of the rotation angle feedback control. As a result, reverse input vibration that becomes noises can be effectively suppressed, and further large pieces of road information can be transmitted to the steering wheel.

In the above-explained electric power steering apparatus, it is preferable that the road information compensating unit should decrease the road information compensation component when a vehicle is stopping.

According to this structure, a phenomenon that the steering angle of the steering wheel returns to a neutral position due to the rotation angle feedback control when the vehicle is stopping can be suppressed.

DETAILED DESCRIPTION OF THE PREFERRED EMBODIMENTS

First Embodiment

An explanation will be given of a first embodiment that embodies an electric power steering apparatus (EPS) of the present invention with reference to FIGS. 1-9.

Figure 1:
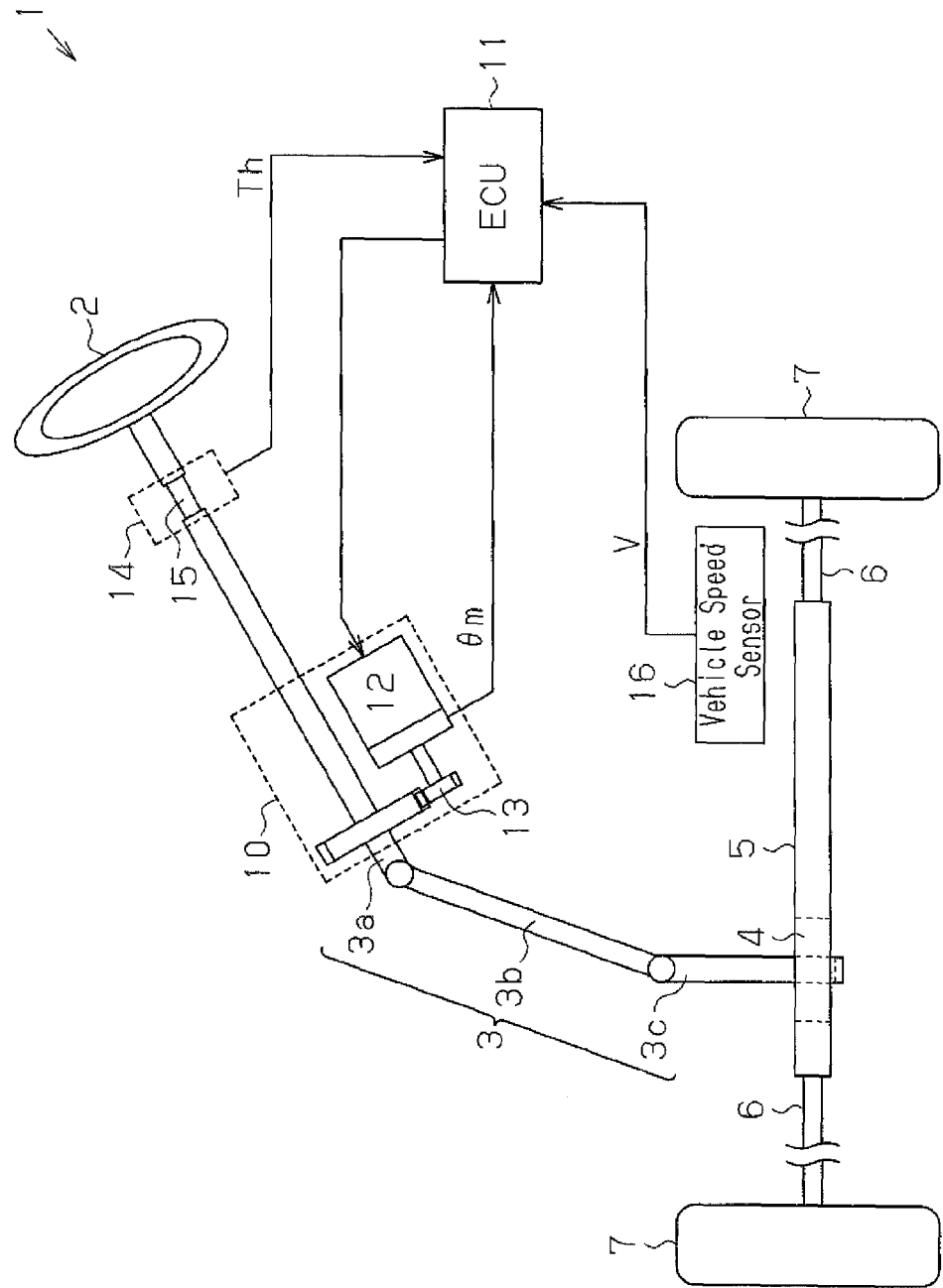
FIG. 1 is a schematic structural diagram illustrating an electric power steering apparatus (EPS)

As illustrated in FIG. 1, a steering wheel 2 is fixed to a steering shaft 3. The steering shaft 3 is coupled with a rack shaft 5 through a rack and pinion mechanism 4. Together with the operation of the steering wheel 2, the steering shaft 3 rotates. The rotation of the steering shaft 3 is converted into a reciprocal linear motion of the rack shaft 5 through the rack and pinion mechanism 4. The steering shaft 3 includes a column shaft 3a, an intermediate shaft 3b, and a pinion shaft 3c coupled with each other. The reciprocal linear motion of the rack shaft 5 is transmitted to unillustrated knuckles through tie rods 6 coupled to both ends of the rack shaft 5. Accordingly, the steering angle of turning wheels 7, i.e., the traveling direction of a vehicle is changed.

An EPS 1 includes an EPS actuator 10 that is a steering force assisting device, and an ECU 11 that is a control unit controlling an actuation of the EPS actuator 10. The EPS actuator 10 applies assist force for assisting the operation of the steering wheel 2 to a steering system.

The EPS actuator 10 is a column type EPS actuator having a motor 12 as a drive source. The motor 12 is coupled with the column shaft 3a through a reduction mechanism 13. The motor 12 is a brushless motor that rotates based on electric drive power of three phases (U, V, and W). The EPS actuator 10 reduces the rotation of the motor 12 and transmits the reduced rotation to the column shaft 3a. Hence, motor torque as assist force is applied to the steering system.

The ECU 11 is coupled with a torque sensor 14. The torque sensor 14 calculates a steering torque Th to be transmitted to the steering shaft 3 based on torsion of a torsion bar 15 provided at the column shaft 3a. The ECU 11 is coupled with a vehicle speed sensor 16. The ECU 11 supplies electric drive power to the motor 12 based on the steering torque Th (and steering torque derivative value dTh) detected by each sensor and a vehicle speed V. The ECU 11 controls the actuation of the EPS actuator 10, i.e., assist force applied to the steering system in this manner.

Next, an explanation will be given of an assist control by the EPS 1 with reference to FIG. 2.

Figure 2:
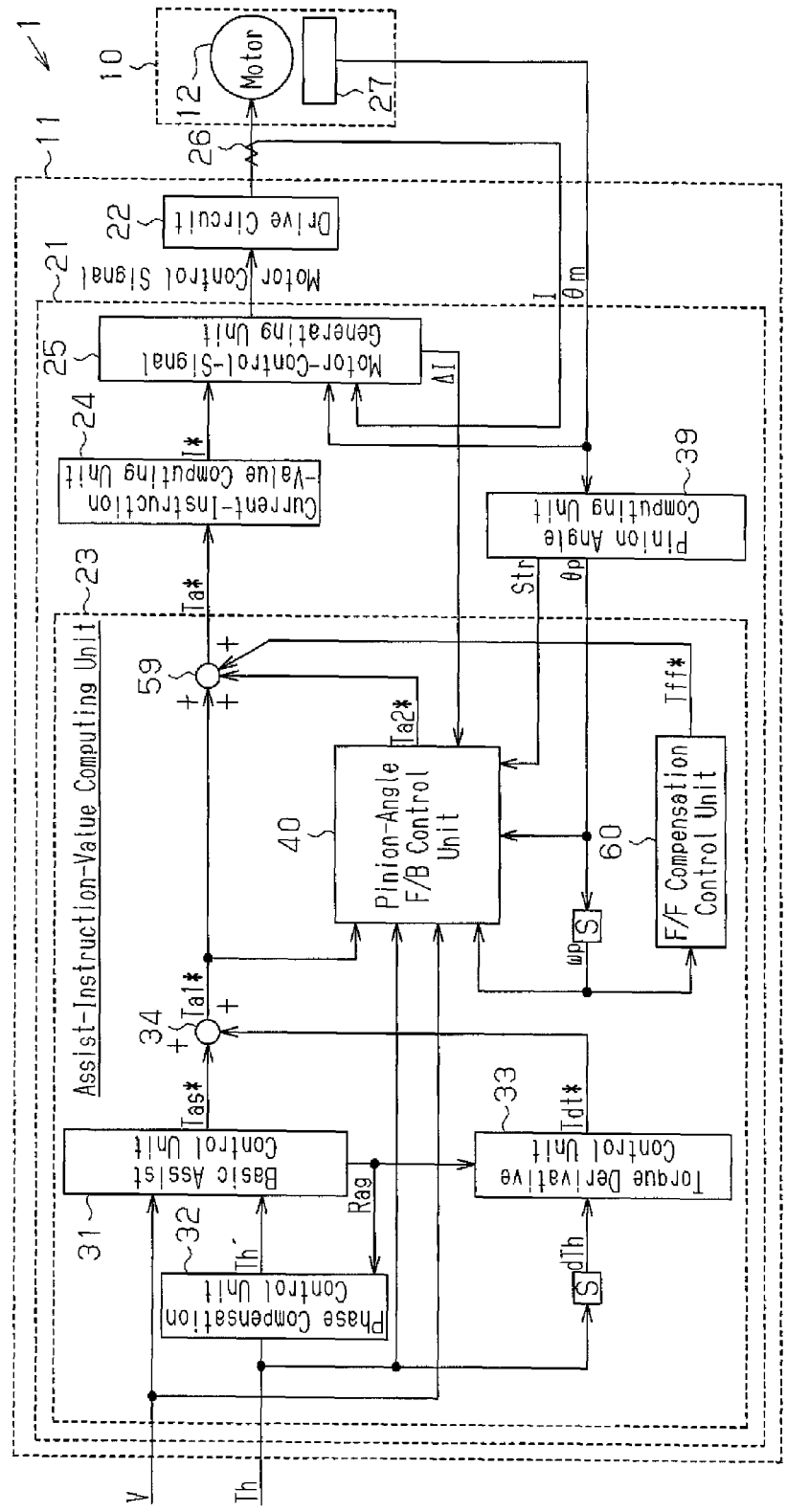
FIG. 2 is a block diagram illustrating a structure of an EPS according to a first embodiment of the present invention.

As illustrated in FIG. 2, the ECU 11 includes a microcomputer 21 that outputs a motor control signal, and a drive circuit 22 that supplies electric drive power to the motor 12 based on the motor control signal. Control blocks indicated below are realized by a computer program run by the microcomputer 21. The microcomputer 21 detects respective state quantities at a predetermined sampling cycle. Next, the microcomputer 21 executes each computing process indicated by each control block below for each predetermined cycle, thereby generating a motor control signal.

The microcomputer 21 includes an assist-instruction-value computing unit 23, and a current-instruction-value computing unit 24. The assist-instruction-value computing unit 23 calculates assist torque to be produced by the motor 12 based on the steering torque Th and the vehicle speed V, i.e., an assist instruction value Ta* corresponding to a target assist force. The current-instruction-value computing unit 24 calculates a current instruction value I* corresponding to the assist instruction value Ta*. The microcomputer 21 causes an actual current value I of the motor 12 to follow the current instruction value I*. A motor-control-signal generating unit 25 performs a current feedback control based on a current deviation ΔI. Hence, the motor-control-signal generating unit 25 generates a motor control signal, and outputs the generated signal to the drive circuit 22.

The current-instruction-value computing unit 24 calculates, as the current instruction value I*, a q-axis current instruction value of a d/q coordinate system (d-axis current instruction value is zero). Input into the motor-control-signal generating unit 25 are phase current values (Iu, Iv, and Iw) of three phases detected as the actual current value I by a current sensor 26, and a motor rotation angle θm detected by a motor resolver (rotation angle sensor) 27, together with the current instruction value I*. The current-instruction-value computing unit 24 maps each phase current value on the d/q coordinate that is a rotation coordinate in accordance with the motor rotation angle θm. The current-instruction-value computing unit 24 executes a current feedback control on the d/q coordinate system, thereby generating a motor control signal.

The assist-instruction-value computing unit 23 includes a basic assist control unit 31 that computes, as a basic component of the assist instruction value Ta*, a basic assist control level Tas*. The assist-instruction-value computing unit 23 also includes a phase compensation control unit 32 that retards the phase of the steering torque Th. The basic assist control unit 31 computes the basic assist control level Tas* based on a steering torque Th' having undergone a phase compensation by the phase compensation control unit 32 and the vehicle speed V.

Figure 3:
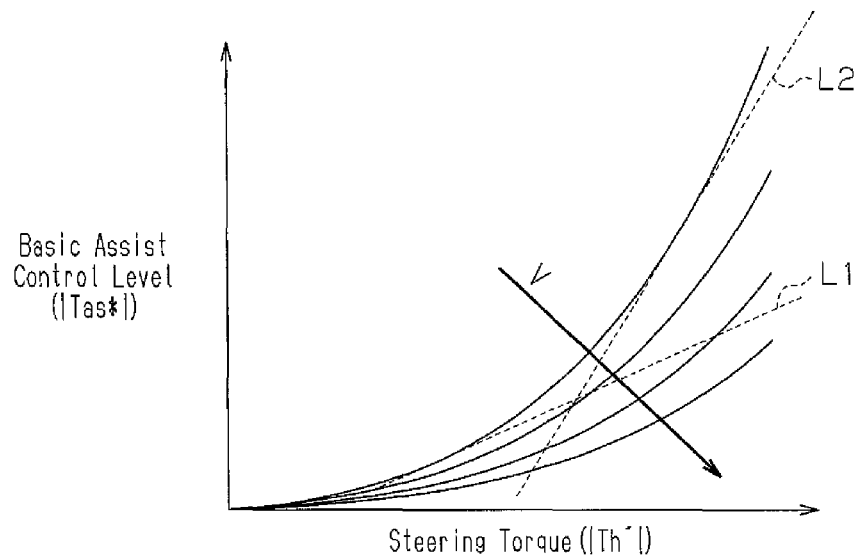
FIG. 3 is a graph illustrating an outline of a basic assist control computation and that of an assist gradient.

As illustrated in FIG. 3, the basic assist control unit 31 calculates the basic assist control level Tas* in such a way that the larger the absolute value of the steering torque Th' is, and the slower the vehicle speed V is, the larger the absolute value of the basic assist control level Tas* becomes. In particular, with respect to the steering torque Th', the larger the steering torque Th' is, the larger the rate of change in the basic assist control level Tas* relative to the change in the steering torque Th' becomes. That is, the larger the steering torque Th' becomes, the larger an assist gradient Rag represented by the slopes of tangent lines L1 and L2 becomes.

As illustrated in FIG. 2, the basic assist control unit 31 outputs the assist gradient Rag in accordance with the steering torque Th' (and the vehicle speed V) to the phase compensation control unit 32. The phase compensation control unit 32 changes the characteristic (filter coefficient) of the phase compensation control based on the assist gradient Rag.

Figure 4:
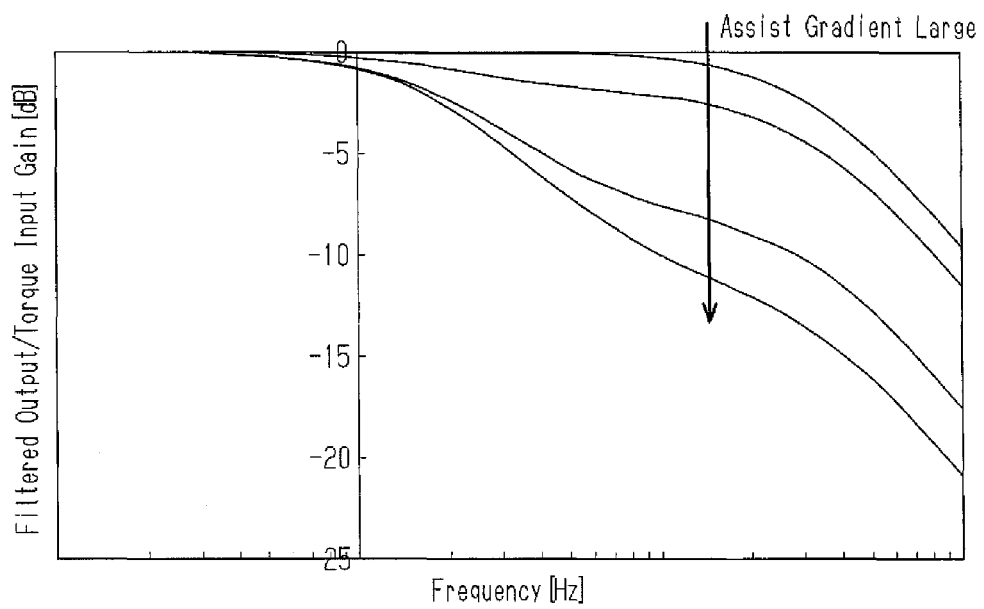
FIG. 4 is a graph illustrating an optimization of a phase compensation control based on an assist gradient.

As illustrated in FIG. 4, the phase compensation control unit 32 changes the characteristic of the phase compensation in such a way that a gain is reduced in accordance with an increase of the assist gradient Rag. In a first embodiment, the current feedback control by the motor-control-signal generating unit 25 suppresses an occurrence of vibration, ensures the control stability, and enhances the responsiveness of the current control, thereby realizing a good steering feeling.

As illustrated in FIG. 2, the assist-instruction-value computing unit 23 includes a torque derivative control unit 33 that calculates a torque derivative control level Tdt* as a compensation component based on the derivative value of the steering torque Th (torque derivative value dTh).

Figure 5:
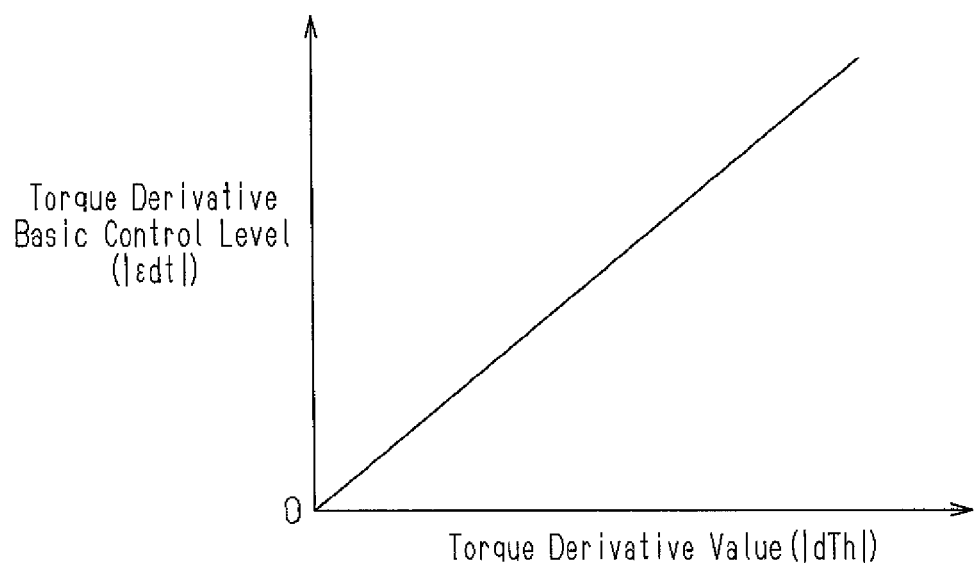
FIG. 5 is a graph illustrating a relationship between a torque derivative value and a torque derivative basic control level.
Figure 6:
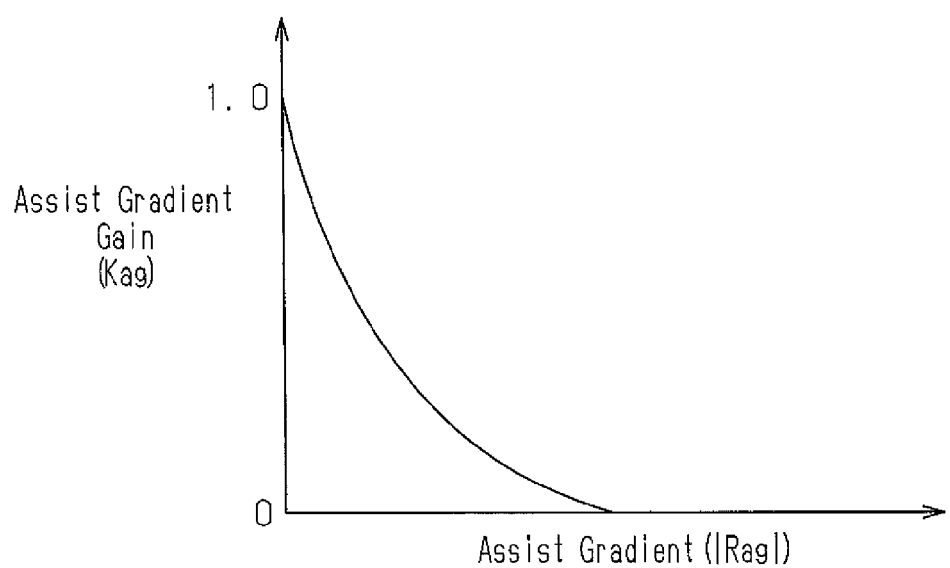
FIG. 6 is a graph illustrating a relationship between an assist gradient and an assist gradient gain.

As illustrated in FIG. 5, the torque derivative control unit 33 calculates a torque derivative basic control level εdt in accordance with the torque derivative value dTh. At this time, the larger the absolute value of the torque derivative value dTh is, the larger the absolute value of the torque derivative basic control level εdt becomes. Moreover, the assist gradient Rag is input into the torque derivative control unit 33. As illustrated in FIG. 6, the torque derivative control unit 33 calculates an assist gradient gain Kag (Kag=1.0 to 0) in accordance with the assist gradient Rag. At this time, the larger the absolute value of the assist gradient Rag is, the smaller the assist gradient gain Kag becomes. The torque derivative control unit 33 outputs the torque derivative control level Tdt* obtained by multiplying the torque derivative basic control level εdt by the assist gradient gain Kag (Tdt*=εdt×Kag).

As illustrated in FIG. 2, the basic assist control level Tas* and the torque derivative control level Tdt* are respectively input into an adder 34. The assist-instruction-value computing unit 23 calculates a first assist component Ta1* based on a value obtained by adding the basic assist control level Tas* with the torque derivative control level Tdt*.

The microcomputer 21 includes a pinion angle computing unit 39 that calculates a rotation angle (pinion angle θp) of the pinion shaft 3c based on a motor rotation angle θm. The pinion angle θp is utilized as a rotation angle of a rotation shaft that can be converted into a steering angle of the turning wheels 7. The assist-instruction-value computing unit 23 includes a pinion-angle F/B control unit 40 which executes a rotation angle feedback control based on the pinion angle θp, and which calculates a second assist component Ta2*.

Figure 7:
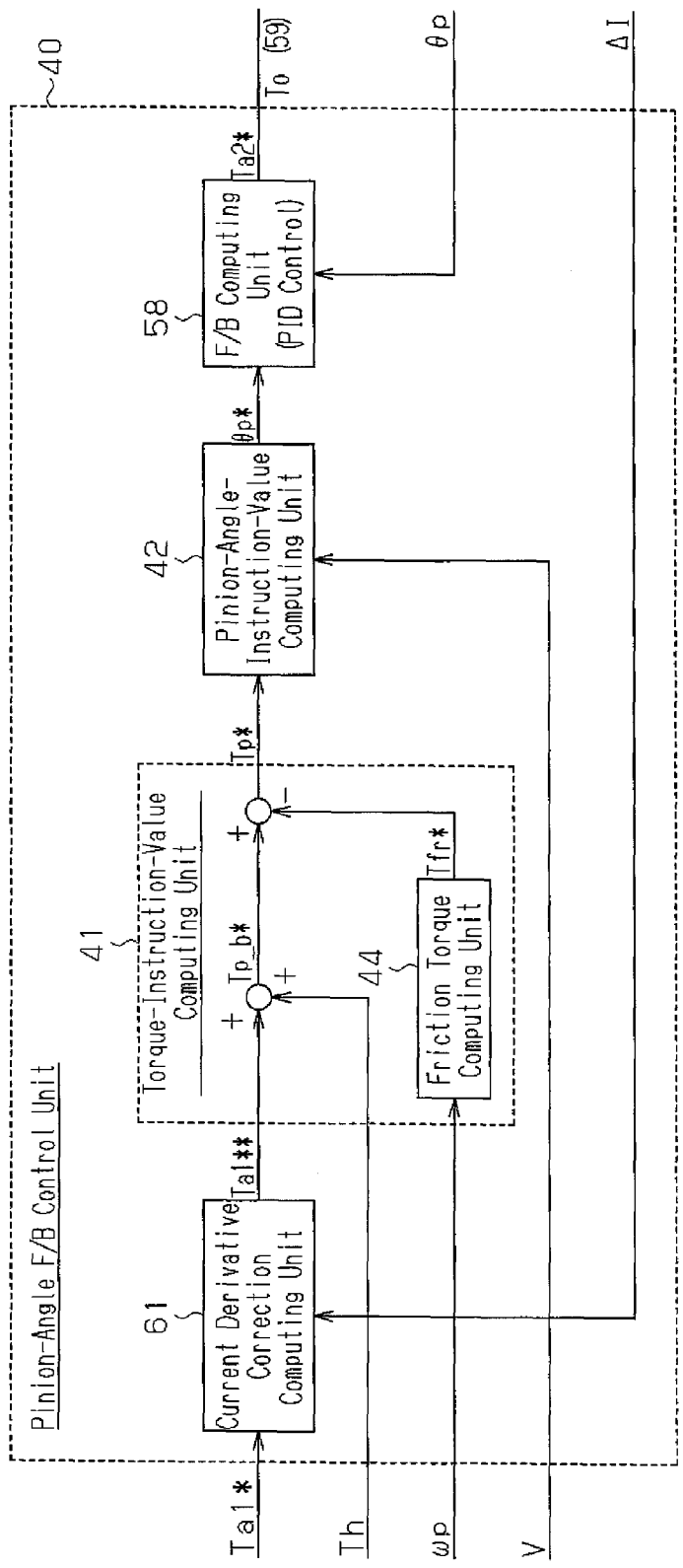
FIG. 7 is a block diagram illustrating a structure of a pinion-angle F/B control unit.

As illustrated in FIG. 7, the pinion-angle F/B control unit 40 includes a torque-instruction-value computing unit 41, a pinion-angle-instruction-value computing unit 42, and an F/B computing unit 58.

The torque-instruction-value computing unit 41 adds the first assist component Ta1* (Ta1**) with the steering torque Th to calculate a basic value Tp_b* of a torque instruction value Tp*. The torque-instruction-value computing unit 41 includes a friction torque computing unit 44 that calculates a friction torque component Tfr* based on a pinion angular speed ωp. The torque-instruction-value computing unit 41 calculates the torque instruction value Tp* by subtracting the friction torque component Tfr* from the basic value Tp_b*, and outputs the torque instruction value Tp* to the pinion-angle-instruction-value computing unit 42. The torque instruction value Tp* corresponds to an input torque transmitted to the pinion shaft 3c.

Figure 8:
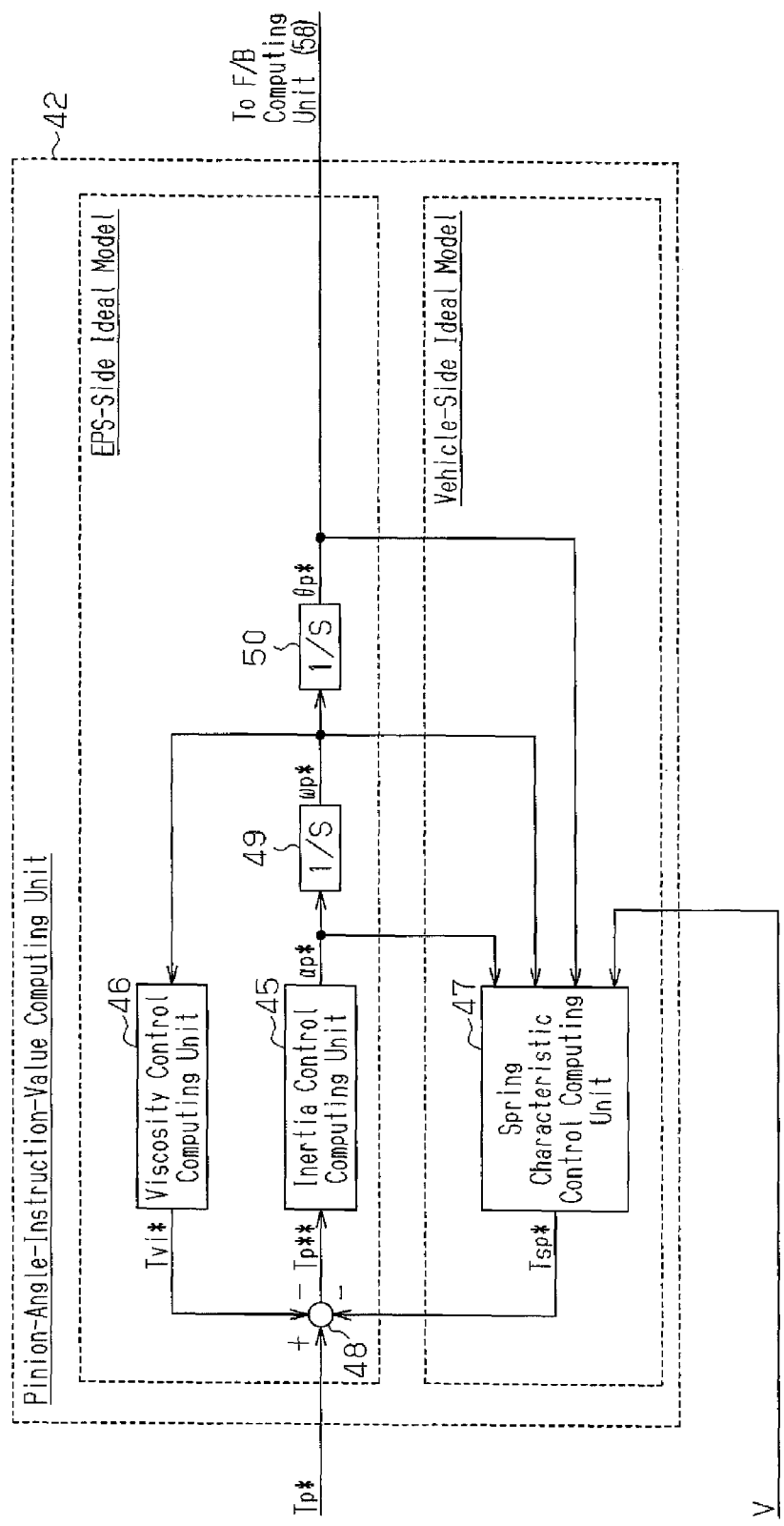
FIG. 8 is a block diagram illustrating a structure of a pinion-angle-instruction-value computing unit.

The pinion-angle-instruction-value computing unit 42 calculates a pinion angle instruction value θp* based on an ideal model (input torque/rotation angle model) of the pinion shaft 3c rotated by the input torque of the torque instruction value Tp*. The pinion angle instruction value θp* is calculated as a rotation angle instruction value of a rotation shaft that can be converted into a steering angle of the turning wheels 7. Moreover, the "input torque/rotation angle model" can be expressed by a spring term based on a rotation angle (pinion angle instruction value θp*) of the pinion shaft 3c, a viscosity term based on a rotation angular speed (pinion angular speed ωp*) of the pinion shaft 3c, and an inertia term. The inertia term is based on a value obtained by subtracting a spring component and a viscosity component that are the respective control outputs of the spring term and the viscosity term from an input torque (torque instruction value Tp*). As illustrated in FIG. 8, the pinion-angle-instruction-value computing unit 42 includes an inertia control computing unit 45 corresponding to the inertia term, a viscosity control computing unit 46 corresponding to the viscosity term, and a spring characteristic control computing unit 47 corresponding to the spring term.

In the pinion-angle-instruction-value computing unit 42, together with a viscosity component Tvi* output by the viscosity control computing unit 46 and a spring component Tsp* output by the spring characteristic control computing unit 47, the torque instruction value Tp* output by the torque-instruction-value computing unit 41 is input in a subtractor 48. The subtractor 48 generates a value (Tp**) by subtracting the viscosity component Tvi* and the spring component Tsp* from the torque instruction value Tp*, and outputs the generated value to the inertia control computing unit 45. The inertia control computing unit 45 calculates an angular acceleration instruction value, i.e., a pinion angular acceleration instruction value αp* of the pinion shaft 3c based on the value (Tp**).

The pinion-angle-instruction-value computing unit 42 includes an integrator 49 that calculates a pinion angular speed instruction value ωp* by integrating the pinion angular acceleration instruction value αp*. The viscosity control computing unit 46 calculates the viscosity component Tvi* based on the pinion angular speed instruction value ωp*. Furthermore, in the pinion-angular-instruction-value computing unit 42, an integrator 50 calculates the pinion angular instruction value θp* by integrating the pinion angular speed instruction value ωp*. The spring characteristic control computing unit 47 calculates a spring component Tsp* based on the pinion angle instruction value θp*.

An explanation will now be given of the "input torque/rotation angle model" that is the ideal model of the rotation angle (pinion angle θp) of the pinion shaft 3c relative to an input torque. The "input torque/rotation angle model" can be divided into an EPS-side ideal model depending on the characteristics of respective components structuring the EPS 1, such as the steering shaft 3 and the motor 12, and a vehicle-side ideal model depending on the characteristic of the vehicle built with the EPS 1. In general, the characteristic of the vehicle affecting the steering characteristic is defined by, for example, the specifications of suspension and a wheel alignment, and gripping force of the turning wheel 7. The EPS-side ideal model is established by the inertia term and the viscosity term, while the vehicle-side ideal model is established by the spring term.

That is, in the pinion-angle-instruction-value computing unit 42, the inertia control computing unit 45 and the viscosity control computing unit 46 objectivize the EPS-side ideal model, and the spring characteristic control computing unit 47 objectivizes the vehicle-side ideal model. The pinion-angle-instruction-value computing unit 42 includes a spring characteristic changing function that changes the spring characteristic of the "input torque/rotation angle model" to arbitrary set the vehicle-side characteristic.

Figure 9:
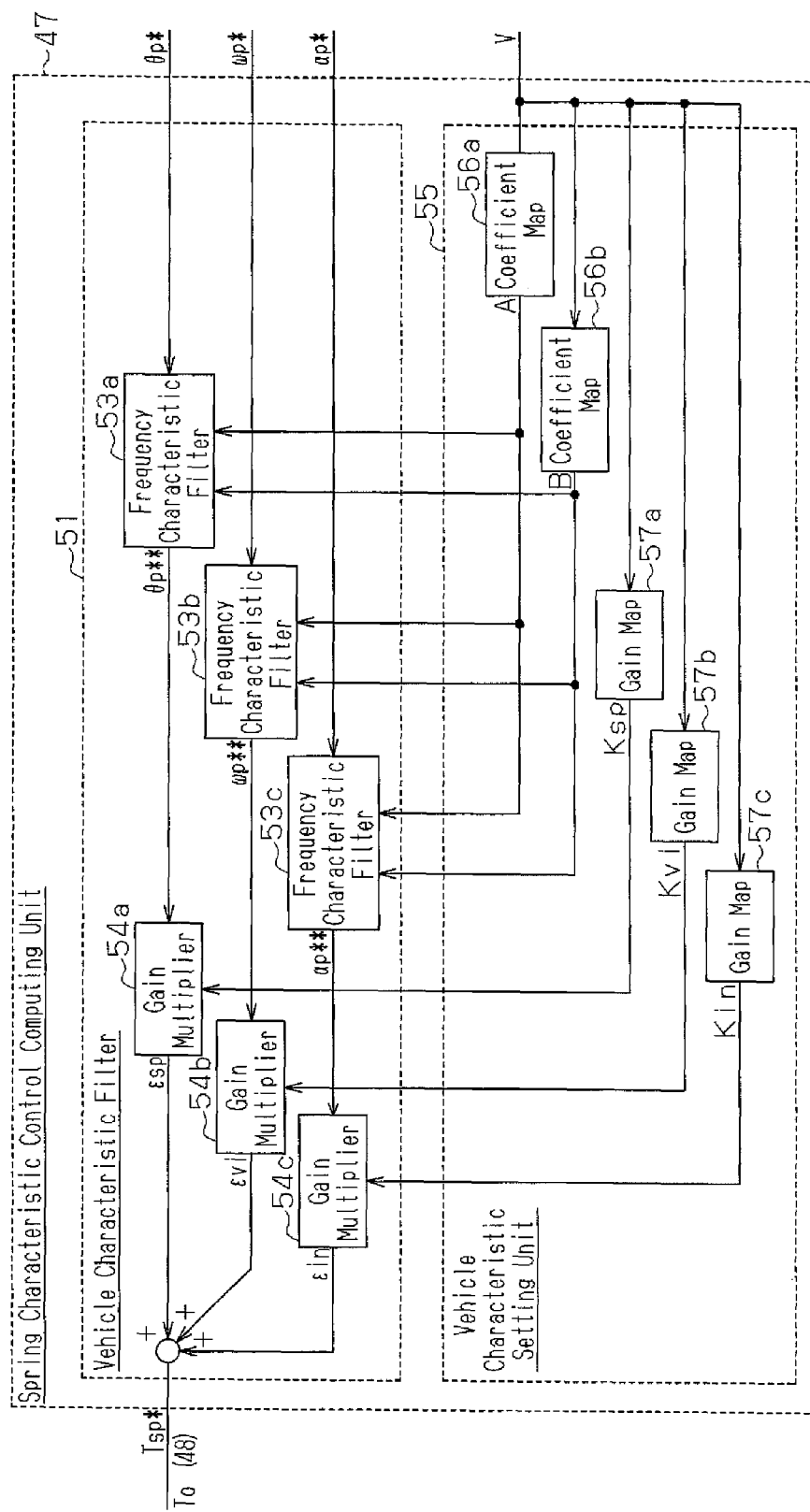
FIG. 9 is a block diagram illustrating a structure of a spring-characteristic-control computing unit.

As illustrated in FIG. 9, input into the spring characteristic control computing unit 47 are, together with the pinion angle instruction value θp*, the pinion angular speed instruction value ωp* and the pinion angular acceleration instruction value αp*, respectively. The spring characteristic control computing unit 47 includes a vehicle characteristic filter 51 that computes the spring component Tsp* based on the instruction value of each dimension (angle, speed, and angular speed).

The vehicle characteristic filter 51 includes frequency characteristic filters 53a to 53c corresponding to the instruction values of the respective dimensions. The vehicle characteristic filter 51 further includes gain multipliers 54a to 54c that multiply the pinion angle instruction value θp having undergone the filter process, the pinion angular speed instruction value ωp and the pinion angular acceleration instruction value αp** by respective corresponding gains. The vehicle characteristic filter 51 adds the control levels (spring control level εsp, viscosity control level εvi, and inertia control level εin) of the respective dimensions output by the respective gain multipliers 54a to 54c to generate the spring component Tsp*, and outputs the generated spring component Tsp* to the subtractor 48.

The spring characteristic control computing unit 47 includes a vehicle characteristic setting unit 55. The vehicle characteristic setting unit 55 calculates filter coefficients A and B, a spring gain Ksp, a viscosity gain Kvi, and an inertia gain Kin, respectively, changing in accordance with the vehicle speed V. The vehicle characteristic setting unit 55 includes coefficient maps 56a and 56b that store respective relationships between the vehicle speed V and the filter coefficients A and B. The vehicle characteristic setting unit 55 further includes a gain map 57a that stores a relationship between the vehicle speed V and the spring gain Ksp, a gain map 57b that stores a relationship between the vehicle speed V and the viscosity gain Kvi, and a gain map 57c that stores a relationship between the vehicle speed V and the inertia gain Kin. The vehicle characteristic setting unit 55 refers to the respective maps, thereby calculating filter coefficients A and B, the spring gain Ksp, the viscosity gain Kvi, and the inertia gain Kin, respectively, in accordance with the vehicle speed V.

In the vehicle characteristic filter 51, the respective frequency characteristic filters 53a to 53c perform filter processes based on each filter coefficient A and B calculated by the vehicle characteristic setting unit 55. The respective gain multipliers 54a to 54c also perform respective multiplications of the spring gain Ksp, the viscosity gain Kvi, and the inertia gain Kin calculated by the vehicle characteristic setting unit 55.

That is, the vehicle characteristic setting unit 55 configures a setting unit that can change the spring characteristic of the "input torque/rotation angle model" as the ideal model. The spring characteristic control computing unit 47 changes the settings of the respective coefficient maps 56a and 56b, and the respective gain maps 57a to 57c, i.e., the relationship among each filter coefficient (A and B), each gain (Ksp, Kvi, and Kv) and the vehicle speed V, thereby changing the spring characteristic of the "input torque and rotating angle model". Hence, the vehicle-side characteristic affecting the steering characteristic can be set arbitrary.

As illustrated in FIG. 7, the pinion angle instruction value θp* calculated by the pinion-angle-instruction-value computing unit 42 is input into the F/B computing unit 58 together with the pinion angle θp that is an actual rotation angle detected by the pinion angle computing unit 39. The F/B computing unit 58 executes proportional-integral-derivative control (PID control) as a rotation angle feedback control based on a deviation between the pinion angle instruction value θp* and the pinion angle θp. Hence, the F/B computing unit 58 generates the second assist component Ta2*.

As illustrated in FIG. 2, input into the pinion-angle F/B control unit 40 is a status signal Str indicating whether or not a detection of the pinion angle θp by the pinion angle computing unit 39 is normal. An example case in which it becomes unable to detect a normal pinion angle θp is that when the motor rotation angle θm detected as a relative angle is converted into the pinion angle θp that is an absolute angle, the midpoint thereof (zero point) becomes unclear. When the status signal Str indicates that it is unable to detect a normal pinion angle θp, the pinion-angle F/B control unit 40 terminates the calculation of the second assist component Ta2*.

The second assist component Ta2* is input into an adder 59 together with the first assist component Ta1*. Moreover, the assist-instruction-value computing unit 23 includes an F/F compensation control unit 60 that calculates a feed forward component Tff* having an advanced phase characteristic based on the pinion angular speed ωp. The feed forward component Tff* output by the F/F compensation control unit 60 is also input into the adder 59. The assist-instruction-value computing unit 23 generates the assist instruction value Ta* based on the value obtained by adding the feed forward component Tff* to the first and second assist components Ta1* and Ta2*, and outputs the generated value to the current-instruction-value computing unit 24.

That is, according to the first embodiment, the pinion angle instruction value θp* is calculated based on the ideal model (input torque/rotation angle model) of the pinion angle θp relative to an input torque, and the second assist component Ta2* is calculated upon execution of the rotation angle feedback control based on the pinion angle instruction value θp*. Accordingly, reverse input vibration from the turning wheels 7 containing relatively high frequency components and produced at the time of straight running and braking, etc., can be effectively canceled. Hence, it becomes possible to design an optimization control of compensation control characteristics of respective kinds based on the assist gradient Rag including the torque derivative control (torque derivative control unit 33) when the first assist component Ta1* is calculated while focusing on the steering characteristic without the need of taking the decreasing function of the reverse input vibration into consideration. The ideal model used for calculating the assist instruction value Ta* is the "input torque/rotation angle model" only. Hence, the first assist component Ta1* and the second assist component Ta2* do not interfere with each other.

Furthermore, the feed forward component Tff* is calculated which has an advanced phase characteristic based on the pinion angular speed ωp that is a derivative value of the pinion angle θp. Accordingly, the responsiveness of the rotation angle feedback control improves. In particular, when it is unable to detect a normal pinion angle θp, the pinion-angle F/B control unit 40 terminates the calculation of the second assist component Ta2*. Hence, at the time of the calculation termination, there is a possibility that a change in torque occurs due to the decrease of the assist instruction value Ta*. According to the first embodiment, however, the feed forward component Tff* is calculated in a parallel manner, thereby easing the decrease of the assist instruction value Ta*.

Moreover, as illustrated in FIGS. 2 and 7, the current deviation ΔI (ΔI=I*−I) calculated when the motor-control-signal generating unit 25 performs a current feedback control is input into the pinion-angle F/B control unit 40. Furthermore, the pinion-angle F/B control unit 40 includes a current deviation correction computing unit 61 that corrects the first assist component Ta1* based on the current deviation ΔI. The torque-instruction-value computing unit 41 carries out the calculation of the torque instruction value Tp* based on the first assist component Ta1** having undergone the correction.

As explained above, according to the first embodiment, the following advantages can be accomplished.

(1) The assist-instruction-value computing unit 23 increases/decreases the torque derivative control level Tdt* on the basis of the torque derivative value dTh based on the assist gradient Rag, and calculates the first assist component Ta1* based on a value obtained by adding the torque derivative control level Tdt* to the basic assist control level Tas* on the basis of the steering torque Th.

Moreover, the assist-instruction-value computing unit 23 includes the pinion-angle F/B control unit 40. The pinion-angle F/B control unit 40 calculates the pinion angle instruction value θp* that can be converted into a steering angle of the turning wheels 7 based on the steering torque Th and the first assist component Ta1*. Next, the pinion-angle F/B control unit 40 executes a rotation angle feedback control based on the pinion angle instruction value θp*. Furthermore, the assist-instruction-value computing unit 23 calculates the assist instruction value Ta* based on the value obtained by adding the second assist component Ta2* calculated by the pinion-angle F/B control unit 40 to the first assist component Ta1*.

That is, the pinion-angle F/B control unit 40 is capable of calculating the pinion angle instruction value θp* based on the ideal model (input torque/rotation angle model) of the pinion angle θp relative to an input torque transmitted to the pinion shaft 3c. Next, the rotation angle feedback control is executed based on the pinion angle instruction value θp* to calculate the second assist component Ta2*. Accordingly, reverse input vibration from the turning wheels 7 containing relatively high frequency components and produced at the time of a straight running and braking, etc., can be effectively canceled. Hence, it becomes possible to design a torque derivative control and an optimization control of the compensation control characteristics of respective kinds based on the assist gradient Rag including the torque derivative control while focusing on the steering characteristic without the need of taking the decreasing function of reverse input vibration into consideration. Moreover, the ideal model used for calculating the assist instruction value Ta* is the "input torque/rotation angle model" only. Accordingly, the first assist component Ta1* and the second assist component Ta2* do not interfere with each other. Hence, reverse input vibration can be suppressed at further higher level, thereby realizing an excellent steering characteristic.

(2) The pinion-angle F/B control unit 40 includes the torque-instruction-value computing unit 41. The torque-instruction-value computing unit 41 calculates the torque instruction value Tp* corresponding to an input torque transmitted to the pinion shaft 3c based on the steering torque Th and the first assist component Ta1*. Moreover, the pinion-angle F/B control unit 40 includes the pinion-angle-instruction-value computing unit 42 that calculates the pinion angle instruction value θp* based on the "input torque/rotation angle model". The pinion-angle-instruction-value computing unit 42 has the spring characteristic changing function that can change the spring characteristic of the ideal model.

That is, the "input torque/rotation angle model" that is an ideal model can be expressed by a spring term based on the rotation angle (pinion angle instruction value θp*) of the pinion shaft 3c, a viscosity term based on the rotation angular speed (pinion angular speed ωp*) of the pinion shaft 3c, and an inertia term based on a value obtained by subtracting the spring component and the viscosity component from an input torque (torque instruction value Tp*). Moreover, the "input torque/rotation angle model" can be divided into the EPS-side ideal model and the vehicle-side ideal model. The EPS-side ideal model is established by the inertia term and the viscosity term, while the vehicle-side ideal model is established by the spring term.

According to such a structure, since the spring characteristic of the "input torque/rotation angle model" is changeable, it becomes possible to set the vehicle-side characteristic affecting the steering characteristic arbitrary. That is, an arbitrary characteristic can be formed through a control regardless of an actual characteristic, the degree of freedom for designing increases. Hence, regardless of the vehicle with which the EPS is built, the steering characteristic can be commonly set, thereby improving the general versatility.

(3) The assist-instruction-value computing unit 23 calculates the feed forward component Tff* based on the pinion angular speed ωp. The assist-instruction-value computing unit 23 calculates the assist instruction value Ta* based on a value obtained by adding the first and second assist components Ta1* and Tat* to the feed forward component Tff*. By calculating the feed forward component Tff* in this manner having the advanced phase characteristic based on the pinion angular speed ωp that is a derivative value of the pinion angle θp, the responsiveness of the rotation angle feedback control improves. Moreover, when it is unable to detect a normal pinion angle θp, it is necessary to terminate the calculation of the second assist component Ta2*. In this case, the assist instruction value Ta* decreases due to the termination of calculation, and thus a change in torque is likely to occur. According to this structure, however, the feed forward component Tff* eases the drop of the assist instruction value Ta*, thereby suppressing an adverse effect on the steering feeling.

(4) The microcomputer 21 executes a current feedback control based on the current instruction value I* corresponding to the assist instruction value Ta*, and generates a motor control signal. The pinion-angle F/B control unit 40 corrects the value of the first assist component Ta1* utilized for a calculation of the pinion angle instruction value θp* (torque instruction value Tp*) based on the current deviation ΔI between the current instruction value I* and the actual current value I. That is, in the case of the EPS 1 utilizing an in-vehicle power source (e.g., a battery), the voltage that the drive circuit 22 can output is limited. Hence, the assist torque becomes likely to be insufficient at the time of fast-speed steering, etc. Accordingly, the deviation in the rotation angle feedback control increases, and the assist insufficiency becomes likely to increase. In this point, according to this structure, when the current deviation ΔI increases over the appropriate range, the value of the first assist component Ta1* utilized for a calculation of the pinion angle instruction value θp* is reduced in accordance with the current deviation ΔI. Accordingly, the increase of the deviation in the rotation angle feedback control can be suppressed.

(5) The microcomputer 21 includes the phase compensation control unit 32 that executes a phase compensation on the steering torque Th, and the basic assist control unit 31 that calculates the basic assist control level Tas* based on the steering torque Th' having undergone the phase compensation. The basic assist control unit 31 outputs the assist gradient Rag in accordance with the steering torque Th' (and the vehicle speed V) to the phase compensation control unit 32. The phase compensation control unit 32 changes the characteristic of the phase compensation control based on the assist gradient Rag. That is, according to this structure, the characteristic of the phase compensation control is changed in accordance with the increase of the assist gradient Rag, while at the same time, the current feedback control executed by the motor control signal generating unit 25 is set. Accordingly, an occurrence of vibration can be suppressed, and thus the control is stabilized, the responsiveness of the current control improves, thereby accomplishing a good steering feeling.

Second Embodiment

Next, an explanation will be given of a second embodiment of the present invention with reference to FIGS. 10 to 15. In the second embodiment, the detailed explanation of the same component as that of the first embodiment will be omitted.

Figure 10:
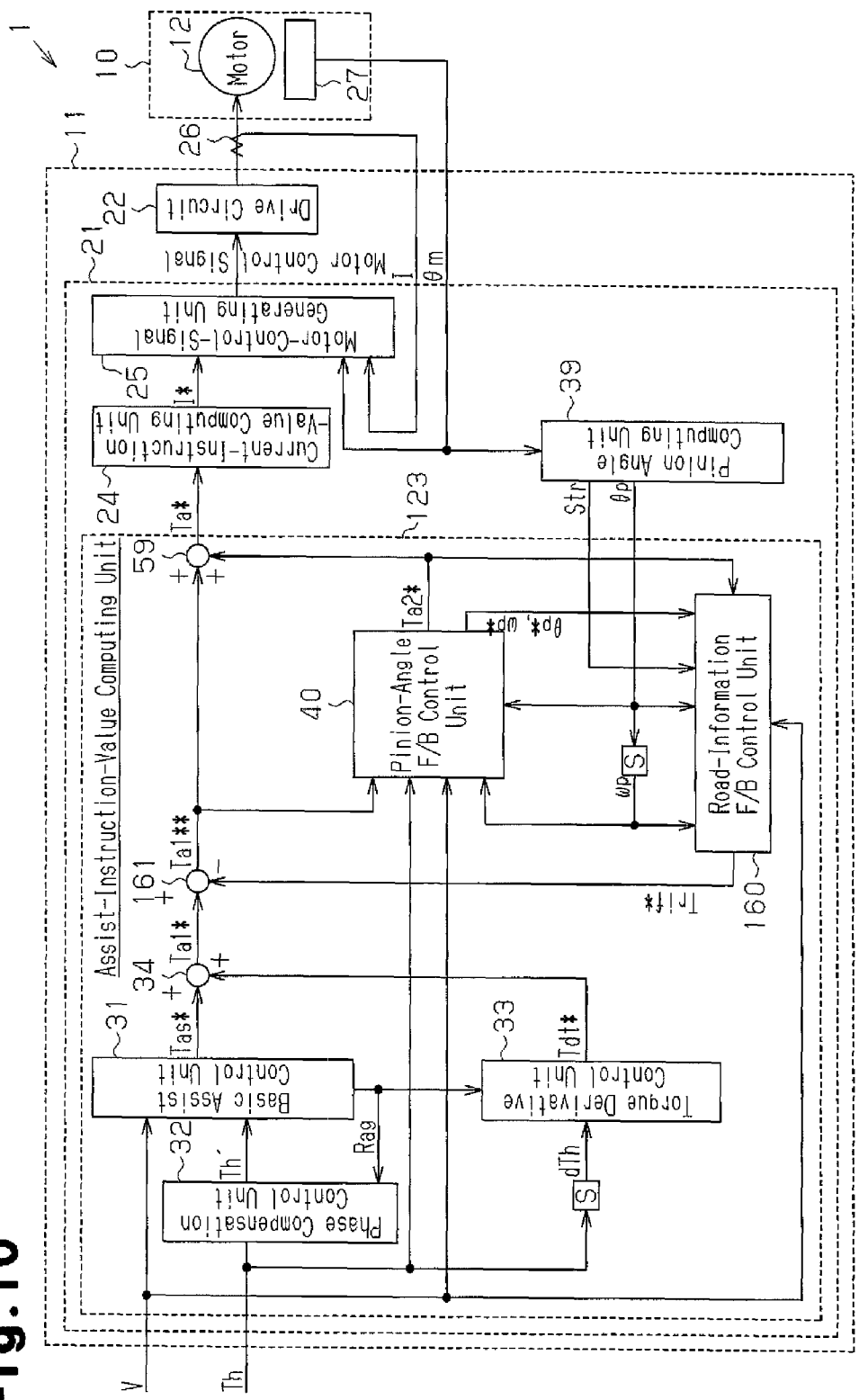
FIG. 10 is a block diagram illustrating a structure of an EPS according to a second embodiment of the present invention.

As illustrated in FIG. 10, an assist-instruction-value computing unit 123 includes a road-information F/B control unit 160. The load-information F/B control unit 160 calculates a road information control level Trif* that reduces the second assist component Ta2* based on the second assist component Ta2*. Moreover, the assist-instruction-value computing unit 123 includes a subtractor 161 at the downstream side over the adder 34. The subtractor 161 superimposes (subtracts) the road information control level Trif* to the first assist component Ta1*.

Figure 11:
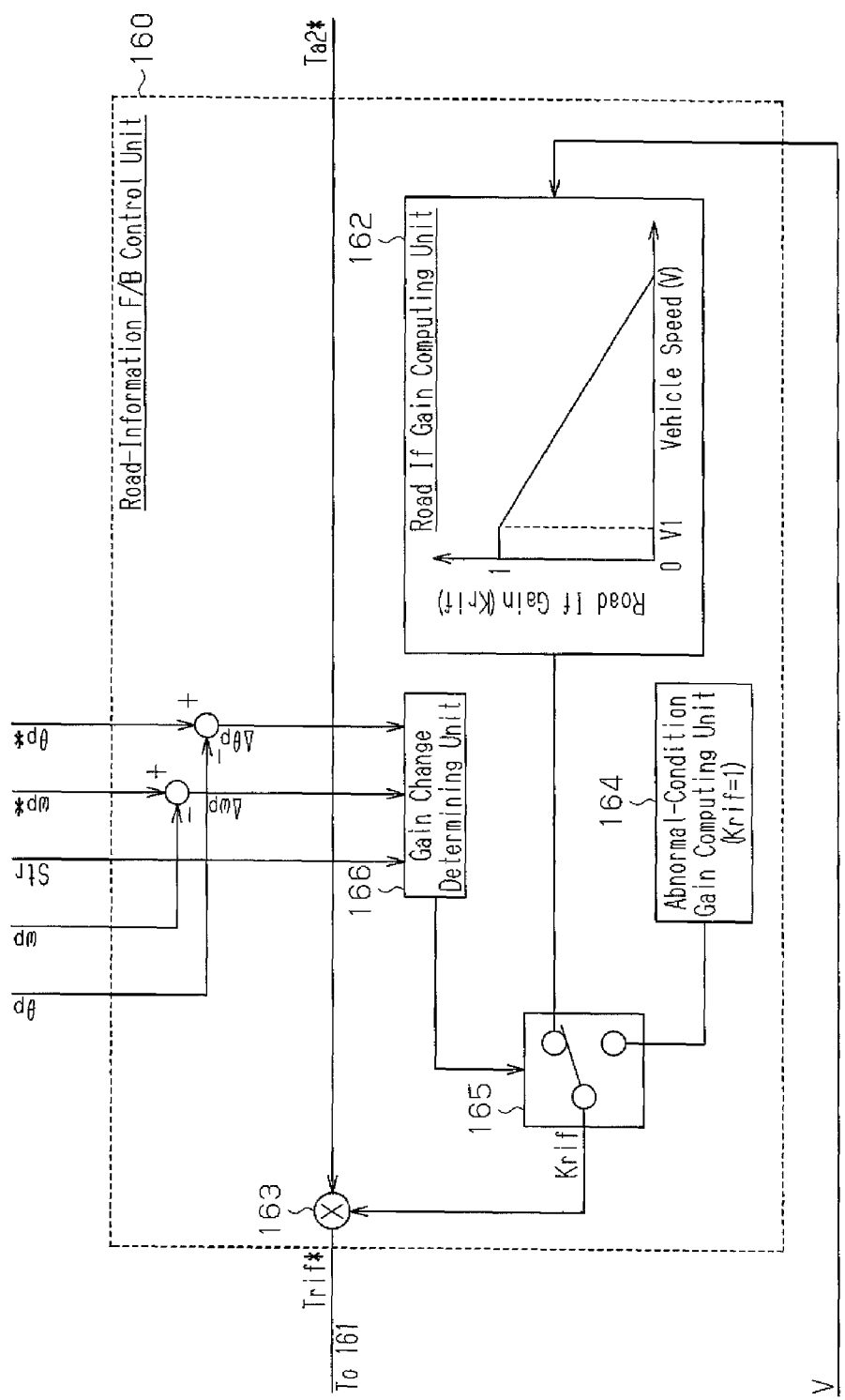
FIG. 11 is a block diagram illustrating a structure of a load-information F/B control unit.

As illustrated in FIG. 11, the road-information F/B control unit 160 includes a road-IF-gain computing unit 162 that calculates a road IF gain Krif, and a multiplier 163. The multiplier 163 multiplies the second assist component Ta2* by the road IF gain Krif, thereby calculating the road information control level Trif*.

When a rotation angle feedback control is performed based on the ideal model (input torque/rotation angle model) of the pinion angle θp relative to an input torque, and the pinion angle θp that is an actual rotation angle is caused to follow the pinion angle instruction value θp*, reverse input vibration from the turning wheels 7 can be effectively canceled. However, a driver obtains various information relating to a running vehicle, such as the road condition and the gripping force of the turning wheels 7, from reverse input torque transmitted to the steering wheel 2 through the steering system. Accordingly, if all pieces of road information are canceled, the steering feeling may be deteriorated.

In consideration of this point, the assist-instruction-value computing unit 123 superimposes the road information control level Trif* that reduces the second assist component Ta2* on the first assist component Ta1**. The assist-instruction-value computing unit 123 calculates the assist instruction value Ta* based on the first assist component Ta1. More specifically, as illustrated in FIG. 10, the pinion-angle F/B control unit 40 executes a "rotation angle feedback control based on the ideal model" on the basis of the first assist component Ta1 having undergone the superimposition. Next, the second assist component Ta2* calculated by the pinion-angle F/B control unit 40 is added to the first assist component Ta1** having undergone the superimposition. Subsequently, the "rotation angle feedback control based on the ideal model" executed by the pinion-angle F/B control unit 40 is invalidated at the power (Krif=1 to 10) indicated by the road IF gain Krif. Accordingly, the reverse input torque from the turning wheels 7 can be transmitted to the steering wheel 2 as road information (road information compensation control).

In the case of a typical EPS, the steering shaft 3 is provided with the torsion bar 15. In this case, the steering feeling performance can be evaluated based on a model (two-input/two-output model) having the "steering torque (Th)" and the "reverse input (F) from the turning wheels" as inputs, and having the "steering angle (θh) of the steering wheel" and the "rotation angle (θp) that can be converted into the turning angle of the turning wheels" as outputs. The "steering feeling performance" is established by four items expressed by a mutual relationship of each state quantity, i.e., a "steering responsiveness (θh & Th)," a "vehicle togetherness (Th & θp)", an "anti-disturbance performance (F & θh)", and "road information (F & Th)". When a road information compensation control is executed, the "two-input/two-output model" can be expressed by a block line diagram of FIG. 12.

Figure 12:
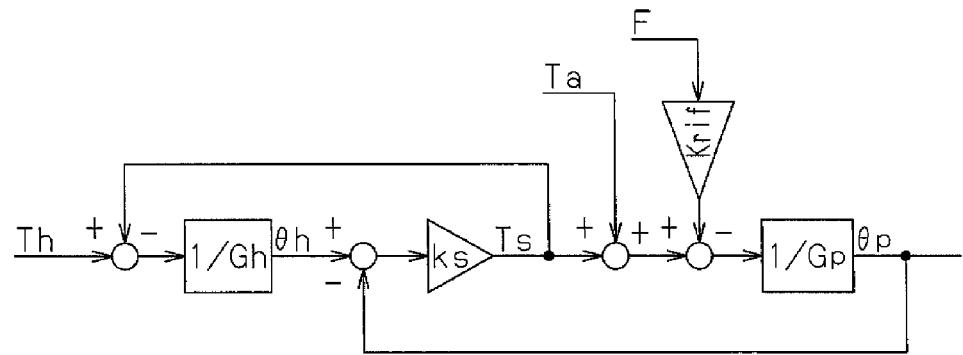
FIG. 12 is a block diagram of a two-input/two-output model.

In FIG. 12, "Gh" is a transmission function (TB upper transmission function) between the torsion bar 15 and the steering wheel 2, and "Gp" is a transmission function (TB lower transmission function) between the torsion bar 15 and the turning wheels 7. "Ks" is a spring constant of the torsion bar 15, "Ts" is a lower transmission torque of the torsion bar 15, and "Ta" is an assist torque.

Figure 13:
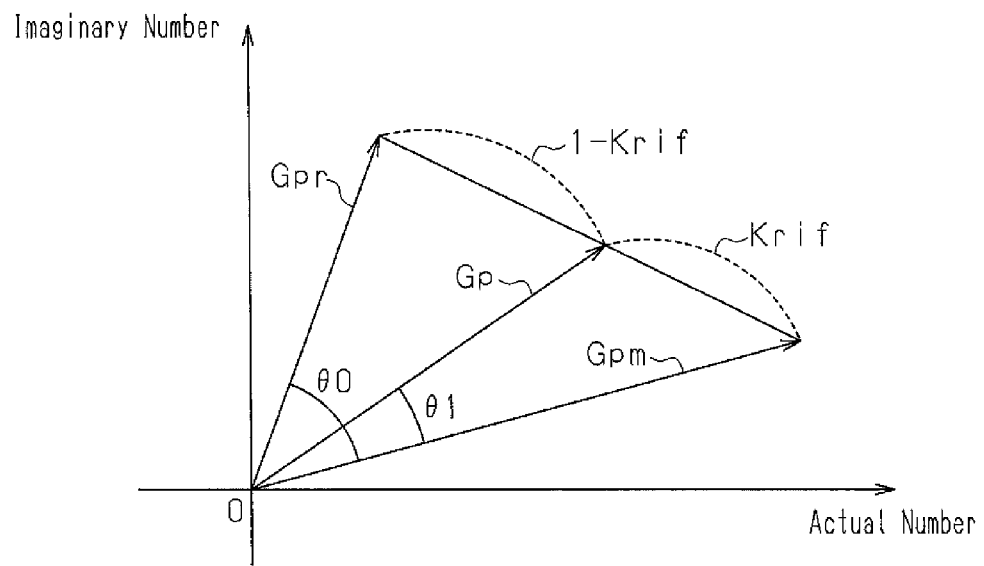
FIG. 13 is a graph illustrating a model load characteristic, an actual load characteristic, and a control load characteristic on a complex plane.

Furthermore, the TB lower transmission function in the ideal model (input torque/rotation angle model) is set as "Gpm", and the TB lower transmission function in the actual vehicle is set as "Gpr". Moreover, the phase difference of the load characteristic (model load characteristic) of the ideal model from the load characteristic (actual load characteristic) of the vehicle is set as "θ0", and the phase difference of the load characteristic (control load characteristic) when a road information compensation control is executed relative to the load characteristic (model load characteristic) of the ideal model is set as "θ1". As illustrated in FIG. 13, by expressing each load characteristic on a complex plane, the "control load characteristic" becomes a characteristic between the "model load characteristic (Krif=0)" and the "actual load characteristic (Krif=1)".

The road-information F/B control unit 160 can freely set the "control load characteristic" between the "model load characteristic (Krif=0)" and the "actual load characteristic (Krif=1)" by setting the road IF gain Krif. The EPS 1 can transmit, as road information, reverse input torque due to a difference in the load characteristic from the ideal model to the steering wheel 2. Accordingly, in addition to a suppression of vibration input as noises from the turning wheels 7, necessary road information can be obtained.

As illustrated in FIG. 11, the road IF gain computing unit 162 calculates the road IF gain Krif based on the vehicle speed V. The road IF gain computing unit 162 calculates in such a way that the faster the vehicle speed V is, the smaller the road IF gain Krif becomes. Within a range of equal to or slower than a vehicle speed V1 corresponding to a vehicle stopping condition, the road IF gain Krif becomes a constant value (Krif=1). Reverse input vibration produced at the time of straight running and braking, etc., increases together with the vehicle speed V. Hence, when the road IF gain Krif is changed in accordance with the vehicle speed V, reverse input vibration, which is noise, can be effectively suppressed. At the same time, larger pieces of road information can be transmitted to the steering wheel 2.

Moreover, the road-information F/B control unit 160 includes an abnormal-condition gain computing unit 164 that calculates the road IF gain Krif that is "1", and a change control unit 165. The change control unit 165 outputs only either one of the calculated value of the abnormal-condition gain computing unit 164 or that of the road IF gain computing unit 162 to the multiplier 63 as the road IF gain Krif.

By setting the road IF gain Krif to be "1", a road information control level Trif* output by the road-information F/B control unit 160 becomes a value that cancels the second assist component Ta2* (Trif*=Ta2*). That is, the "rotation angle feedback control based on the ideal model" executed by the pinion-angle F/B control unit 40 is completely invalidated. Next, as illustrated in FIG. 13, the road-information F/B control unit 160 causes the "control load characteristic" when a certain condition is satisfied to be consistent with the "actual load characteristic".

The road-information F/B control unit 160 includes a gain change determining unit 166. The actuation of the change control unit 165 is controlled by the gain change determining unit 166. As illustrated in FIG. 11, input into the gain change determining unit 166 is a status signal Str indicating whether or not a detection of the pinion angle θp by the pinion-angle computing unit 39 is normal. An example case in which it becomes unable to detect a normal pinion angle θp is that when the motor rotation angle θm detected as a relative angle is converted into the pinion angle θp that is an absolute angle, the midpoint thereof (zero point) becomes unclear. When the status signal Str indicates that "it is unable to detect a normal pinion angle θp", the gain change determining unit 166 changes the value of the road IF gain Krif to be output to the multiplier 163 to be "1" that is a calculated value by the abnormal-condition gain computing unit 164.

Moreover, input into the gain change determining unit 166 are, respectively, a rotation angle deviation Δθp between the pinion angle instruction value θp* and the pinion angle θp, and, a rotation angular speed deviation Δωp between the pinion angular speed instruction value ωp* and the pinion angular speed ωp. When it is estimated that the status is dissociated with the ideal model based on the rotation angle deviation Δθp and the rotation angular speed deviation Δωp, the gain change determining unit 166 changes the value of the road IF gain Krif to be output to the multiplier 163 to "1" that is a calculated value by the abnormal-condition gain computing unit 164.

Figure 14:
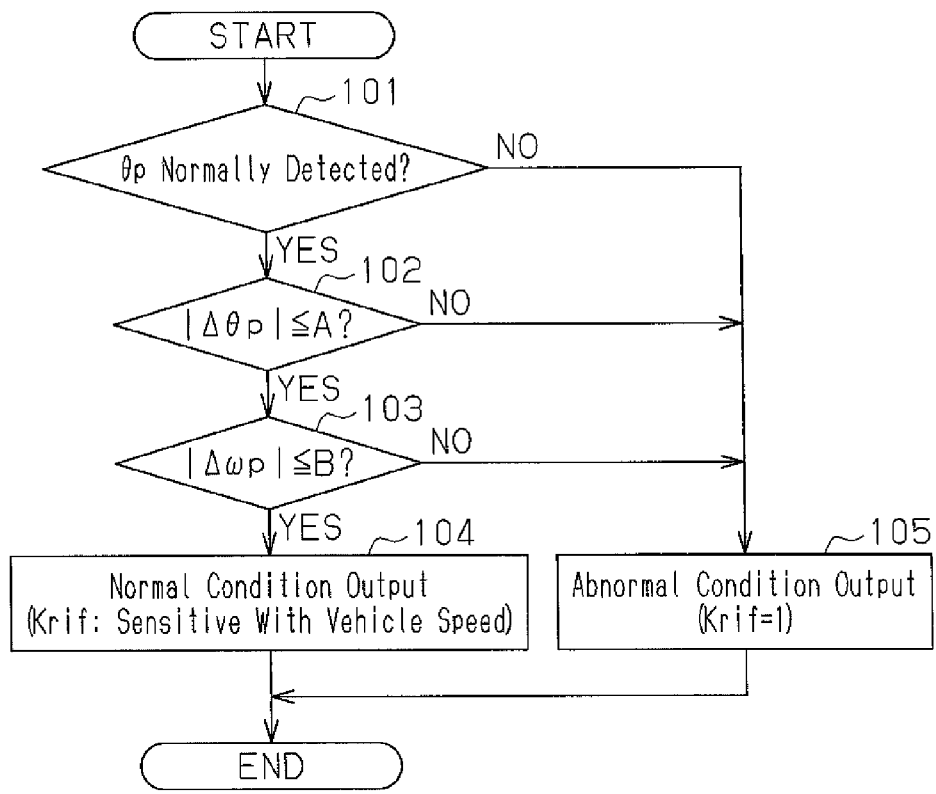
FIG. 14 is a flowchart illustrating a process procedure of a gain change determination.

As illustrated in FIG. 14, first, the gain change determining unit 166 determines whether or not a detection of the pinion angle θp is normal based on the status signal Str (step 101). Next, in the step 101, when determining that the detection of the pinion angle θp is normal (step 101: YES), the gain change determining unit 166 determines whether or not (the absolute value of) the rotation angle deviation Δθp is equal to or smaller than a predetermined value A (step 102). In the step 102, when determining that the rotation angle deviation Δθp is equal to or smaller than the predetermined value A (|Δθp|≤A, step 102: YES), the gain change determining unit 166 determines whether or not (the absolute value of) the rotation angular speed deviation $\Delta\omega p$ is equal to or smaller than a predetermined value B (step 103). When determining that the rotation angular speed deviation $\Delta\omega p$ is equal to or smaller than the predetermined value B ($|\Delta\omega p|\leq B$, step 103: YES), the gain change determining unit 166 determines that a calculated value by the road IF gain computing unit 162 changing in accordance with the vehicle speed V should be output as the road IF gain Krif (normal output, step 104).

Conversely, when determining that it is unable to detect a normal pinion angle $\theta p$ (step 101: NO), the gain change determining unit 166 determines that the calculated value that is "1" by the abnormal-condition gain computing unit 164 should be output as the road IF gain Krif (abnormal output, step 105). When determining that the rotation angle deviation $\Delta\theta p$ is larger than the predetermined value A ($|\Delta\theta p|>A$, step 102: NO) or when determining that the rotation angular speed deviation $\Delta\omega p$ is larger than the predetermined value B ($|\Delta\omega p|>B$, step 103: NO), the gain change determining unit 166 executes the step 105, and determines that the road IF gain Krif that is "1" should be output.

That is, when it is unable to detect a normal pinion angle $\theta p$, it is unable to execute a rotation angle feedback control correctly. Moreover, at the time of an execution of a rotation angle feedback control, when the rotation angle deviation $\Delta\theta p$ (and the rotation angular speed deviation $\Delta\omega p$) remarkably increases, it is estimated that it becomes unable to cause the pinion angle $\theta p$ that is an actual rotation angle to follow the pinion angle instruction value $\theta p^*$ calculated based on the ideal model, i.e., that the actual condition differs from the ideal model. Example conditions in which the rotation angle deviation $\Delta\theta p$ and the rotation angular speed deviation $\Delta\omega p$ remarkably increase are a case in which the vehicle collides a curbstone, a case in which a steering wheel is excessively operated over a steering end, and a case in which it exceeds a limit of a current control based on a power source voltage. When, under such a condition, the rotation angle feedback control is continued, the assist insufficiency increases, and thus the control may become unstable.

When a certain condition is satisfied relative to a "condition in which a rotation angle feedback control based on an ideal model should be terminated", the road-information F/B control unit 160 sets the value of the road IF gain Krif to be "1", and calculates the road information control level Trif* that cancels the second assist component Ta2*. The road information control level Trif* calculated in this manner completely invalidates the rotation angle feedback control based on the ideal model, and thus a fast fail safe is accomplished.

According to the second embodiment as explained above, the following advantages can be accomplished.

(6) The assist-instruction-value computing unit 123 includes the road-information F/B control unit 160. The road-information F/B control unit 160 multiplies the second assist component Ta2* obtained upon execution of the rotation angle feedback control based on the ideal model by the road IF gain Krif. Hence, the road information control level Trif* that decreases the second assist component Ta2* is calculated. According to this structure, by setting the road IF gain Krif, the load characteristic (control load characteristic) on a control can be freely controlled between the load characteristic (model load characteristic: Krif=0) of the ideal model and the load characteristic (actual load characteristic: Krif=1) of the actual vehicle. Next, reverse input torque developed due to a difference in the load characteristic from the ideal model can be transmitted to the steering wheel 2 as road information. Accordingly, vibration that is noises input from the turning wheels 7 is suppressed, but necessary road information can be obtained.

(7) The road-information F/B control unit 160 as road information compensating unit includes the road IF gain computing unit 162 that calculates the road IF gain Krif based on the vehicle speed V. The road IF gain computing unit 162 calculates in such a way that the faster the vehicle speed V is, the smaller the value of the road IF gain Krif becomes. That is, reverse input vibration produced at the time of straight running and braking, etc., increases together with the vehicle speed V. Hence, according to this structure, the road IF gain Krif is changed in accordance with the vehicle speed V, and a vibration suppression effect upon execution of the "rotation angle feedback control based on the ideal model" is effectively accomplished. As a result, reverse input vibration to be noises is effectively suppressed, while at the same time, larger pieces of road information are transmitted to the steering wheel 2.

(8) When the status signal Str indicates that "it is unable to detect a normal pinion angle $\theta p$", the road-information F/B control unit 160 sets the value of the road IF gain Krif to be "1", and calculates the road information control level Trif* that cancels the second assist component Tat*.

(9) When it is estimated that the actual condition differs from the ideal model based on at least either one of the rotation angle deviation $\Delta\theta p$ and the rotation angular speed deviation $\Delta\omega p$, the road-information F/B control unit 160 sets the value of the road IF gain Krif to be "1" and calculates the road information control level Trif* that cancels the second assist component Ta2*.

In general, a rotation angle feedback control cannot be performed correctly without a detection of a normal pinion angle $\theta p$. Moreover, at the time of an execution of the rotation angle feedback control, when the rotation angle deviation $\Delta\theta p$ (and the rotation angular speed deviation $\Delta\omega p$) remarkably increases, it is estimated that it is unable to cause the pinion angle $\theta p$ that is an actual rotation angle to follow the pinion angle instruction value $\theta p^*$ calculated based on the ideal model, i.e., that the actual condition differs from the ideal model. When, under such a condition, the rotation angle feedback control is continued, the assist insufficiency increases, and thus the control may become unstable. In this point, according to the structures of (8) and (9), by completely invalidating the rotation angle feedback control based on the ideal model, when "the rotation angle feedback control based on the ideal model should be terminated", a fail-safe can be rapidly accomplished. This results in a further higher reliability.

Note that the first and second embodiments can be modified as follows.

The present invention may be applied to an EPS of pinion type and rack-assist type, etc.

The rotation shaft that can be converted into the turning angle of the turning wheels 7 may be the column shaft 3a or the intermediate shaft 3b, or may be a motor rotation shaft.

The control characteristic may be optimized based on the assist gradient Rag together with an execution of other compensation controls with respect to the torque derivative control and the phase compensation control on the steering torque Th. Moreover, regarding the other compensation controls, the control characteristics may be optimized based on the assist gradient Rag.

The torque derivative control unit 33 calculates, as the torque derivative control level Tdt* (Tdt*=$\epsilon$dt$\times$Keg), the value increasing/decreasing based on the assist gradient gain Kag, but the torque derivative control level Tdt* may be corrected based on the assist gradient gain Kag outside the torque derivative control unit 33.

The pinion angle computing unit 39 detects the pinion angle θp based on the motor rotation angle θm detected by the motor resolver (rotation angle sensor) 27, but the pinion angle θp may be detected by a rotation angle sensor.

The torque-instruction-value computing unit 41 includes the friction torque computing unit 44 that calculates the friction torque component Tfr* based on the pinion angular speed ωp, and subtracts the friction torque component Tfr* from the added value of the first assist component Ta1* and the steering torque Th to generate the torque instruction value Tp*, but other component than the friction torque component Tfr* may be added to the basic added value of the first assist component Ta1* and the steering torque Th. Moreover, the calculation of the friction torque component Tfr* may be omitted.

The current deviation correction computing unit 61 corrects the first assist component Ta1* utilized for a calculation of the pinion angle instruction value θp* (torque instruction value Tp*) based on the current deviation ΔI, but the pinion angle instruction value θp* calculated by the pinion-angle-instruction-value computing unit 42 may be corrected. Moreover, the second assist component Ta2* calculated by the pinion-angle F/B control unit 40 may be reduced and corrected. In this case, also, the increase of the deviation in a rotation angle feedback control can be suppressed. However, the structure of correcting the first assist component Ta1* has an advantage of being able to reduce the assist instruction value Ta* without deteriorating the shape of the ideal model of the rotation angle relative to the input torque.

Moreover, a correction based on the current deviation ΔI may be reduced not only when the current deviation ΔI increases and exceeds the appropriate range but also in accordance with the current deviation ΔI. When the current deviation ΔI exceeds the appropriate range, the first assist component Ta1* utilized for a rotation angle feedback control may be limited to be equal to or smaller than a predetermined value.

Figure 15:
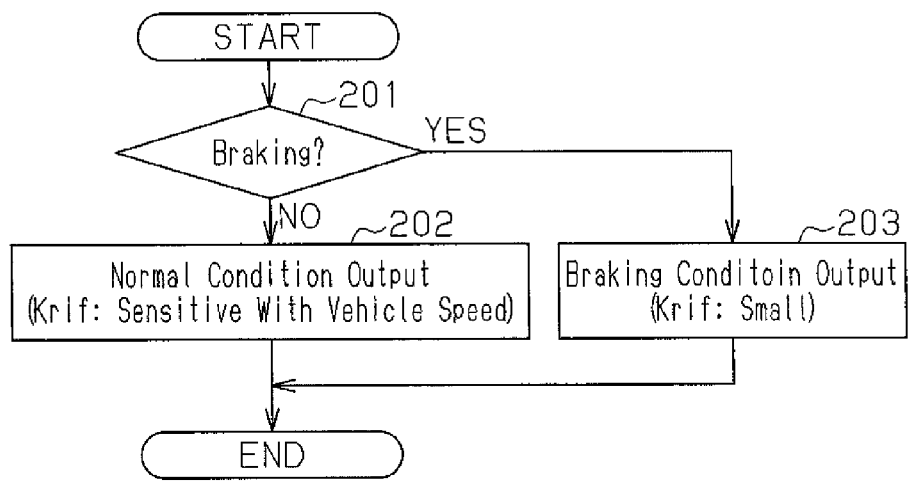
FIG. 15 is a flowchart illustrating a process procedure of a gain change control.

The road IF gain Krif as the road information compensation component is changed in accordance with the vehicle speed V, but the road IF gain Krif may be changed in such a way that the road information control level Trif* becomes small at the time of braking. More specifically, as illustrated in the flowchart of FIG. 15, whether or not it is in a braking condition is determined (step 201), and when it is not in a braking condition (step 201: NO), the road IF gain Krif is calculated in accordance with the vehicle speed V (step 202). When determined in the step 201 that it is in a braking condition (step 201: YES), a further smaller road IF gain Krif is calculated (step 203). That is, in a braking condition, vibration with a relatively high frequency likely to be recognized as noises is produced. In this case, the road information control level Trif* is reduced, so as to effectively activate the vibration suppression effect through an execution of the "rotation angle feedback control based on the ideal model". As a result, reverse input vibration that becomes noises can be effectively suppressed, while at the same time, further larger pieces of road information can be transmitted to the steering wheel 2.

When at least either one of the rotation angle deviation Δθp or the rotation angular speed deviation Δωp remarkably increases, and it is estimated that the actual condition differs from the ideal model, the value of the road IF gain Krif is set to be "1" and the road information control level Trif* that cancels the second assist component Ta2* is calculated, but a modification can be applied as follows. That is, a divergence (a level of difference) from the ideal model may be estimated based on at least either one of the rotation angle deviation Δθp or the rotation angular speed deviation Δωp, and the road IF gain Krif may be changed based on the divergence. In a normal case, the more the rotation angle deviation Δθp and the rotation angular speed deviation Δωp become, the higher the estimated divergence from the ideal model becomes. In this case, the road IF gain Krif is changed in such a way that the higher the divergence is, the larger the road information control level Trif* becomes to invalidate the "rotation angle feedback control based on the ideal model". This makes the control stabilized.

The road-information F/B control unit 160 automatically changes the value of the road IF gain Krif, but the value of the road IF gain Krif may be changed upon an operation to the setting unit by a driver. When, for example, the vehicle runs on a low-μ road like a case in which the road is icy, it is desirable to obtain further large pieces of road information. In this case, when the quantity of road information obtainable upon setting of the setting unit can be set, the steering feeling can be improved.

The subtractor 161 provided at the downstream side over the adder 34 which adds the basic assist control level Tas* and the torque derivative control level Tdt* superimposes (subtracts) the road information control level Trif* on the first assist component Ta1*, but the road information control level Trif* may be superimposed on the first assist component Ta1* at the respective upstream side of the pinion-angle F/B control unit 40 and upstream side of the adder 59.

The invention claimed is:

1. An electric power steering apparatus comprising a steering force assisting device and a control unit, wherein
   the steering force assisting device comprises a motor as a drive source and applies assist force to a steering system,
   the control unit sets a basic component of the assist force based on steering torque transmitted to a steering shaft,
   the control unit increases/decreases a compensation component based on a change rate of the basic component relative to a change in the steering torque, and calculates a first assist component based on a value obtained by adding the compensation component to the basic component,
   the control unit calculates a rotation angle instruction value of a rotation shaft that can be converted into a turning angle of a turning wheel based on the steering torque and the first assist component,
   the control unit executes a rotation angle feedback control based on the rotation angle instruction value to calculate a second assist component, and
   the control unit controls an actuation of the steering force assisting device based on an assist instruction value that is on a basis of a value obtained by adding the second assist component to the first assist component.

2. The electric power steering apparatus according to claim 1, wherein
   the control unit calculates input torque transmitted to the rotation shaft based on an addition value of the steering torque with the first assist component, and
   the control unit calculates the rotation angle instruction value based on an ideal model of the rotation angle relative to input torque.

3. The electric power steering apparatus according to claim 2, wherein
   the ideal model is represented by a spring term based on a rotation angle, a viscosity term based on a rotation angular speed, and an inertia term on a basis of a value obtained by subtracting a spring component and a viscosity component that are respective control outputs by the spring term and the viscosity term from the input torque, and the control unit comprises a setting unit that is capable of changing a characteristic of the spring term.

4. The electric power steering apparatus according to claim 1, wherein the control unit executes a current feedback control based on a current instruction value corresponding to the assist instruction value, supplies drive power to the motor, and controls an actuation of the steering force assisting device, and the control unit corrects a value of the first assist component utilized for a calculation of the rotation angle instruction value based on a current deviation between the current instruction value and an actual current value.

5. The electric power steering apparatus according to claim 1, wherein the control unit executes a phase compensation on detected steering torque, the control unit calculates the basic component based on steering torque having undergone the phase compensation, and the control unit changes a characteristic of the phase compensation based on a change rate of the basic component relative to a change in the steering torque.

6. The electric power steering apparatus according to claim 2, wherein the control unit calculates a friction component based on a rotation angular speed of the rotation shaft, and the control unit calculates the input torque based on a value obtained by subtracting the friction component from an addition value of the steering torque and the first assist component.

7. The electric power steering apparatus according to claim 1, wherein the control unit executes a current feedback control based on a current instruction value corresponding to the assist instruction value, and the control unit supplies drive power to the motor to control an actuation of the steering force assisting device and corrects a value of the second assist component based on a deviation between the current instruction value and an actual current value.

8. The electric power steering apparatus according to claim 1, wherein when an actual rotation angle utilized for an execution of the rotation angle feedback control is undetectable, the control unit terminates a calculation of the second assist component.

9. The electric power steering apparatus according to claim 1, further comprising:

a road information compensating unit that calculates a road information compensation component which reduces the second assist component, wherein a magnitude of the second assist component is adjustable in accordance with a magnitude of the road information compensation component.

10. The electric power steering apparatus according to claim 9, wherein the faster a vehicle speed is, the smaller the road information compensation component calculated by the road information compensating unit becomes.

11. The electric power steering apparatus according to claim 9, wherein when an actual rotation angle utilized for the rotation angle feedback control is undetectable, the road information compensating unit cancels the second assist component by the road information compensation component.

12. The electric power steering apparatus according to claim 9, wherein the control unit calculates the rotation angle instruction value based on an ideal model of the rotation angle relative to input torque transmitted to the rotation shaft, and executes the rotation angle feedback control, the road information compensating unit estimates a divergence from the ideal model based on at least either one of a rotation angle deviation of the rotation shaft and a rotation angular speed deviation, and the road information compensating unit changes a magnitude of the road information compensation component in accordance with the divergence.

13. The electric power steering apparatus according to claim 12, wherein when estimating that an actual condition differs from the ideal model based on at least either one of the rotation angle deviation of the rotation shaft and the rotation angular speed deviation, the road information compensating unit cancels the second assist component by the road information compensation component.

14. The electric power steering apparatus according to claim 9, wherein the road information compensating unit decreases the road information compensation component at a time of braking.

15. The electric power steering apparatus according to claim 9, wherein the road information compensating unit decreases the road information compensation component when a vehicle is stopping.

* * * * *